(12) United States Patent
Oh

(10) Patent No.: US 6,416,032 B2
(45) Date of Patent: Jul. 9, 2002

(54) EXPANSION VALVE OF AN AIR CONDITIONING SYSTEM IN AN AUTOMOBILE

(75) Inventor: Man Ju Oh, Ulsan (KR)

(73) Assignee: Hyundai Motor Co., Seoul (KR)

( * ) Notice: Subject to any disclaimer, the term of this patent is extended or adjusted under 35 U.S.C. 154(b) by 0 days.

(21) Appl. No.: 09/749,390

(22) Filed: Dec. 28, 2000

(30) Foreign Application Priority Data

May 17, 2000 (KR) ............................................ 00-26486

(51) Int. Cl.[7] .............................................. F16K 31/00
(52) U.S. Cl. .............................. 251/14; 251/58; 251/61; 251/208; 251/229; 251/264
(58) Field of Search ............................. 251/14, 58, 61, 251/77, 120, 264, 266, 278, 229, 208

(56) References Cited

U.S. PATENT DOCUMENTS

| | | | | |
|---|---|---|---|---|
| 3,298,659 A | * | 1/1967 | Cupedo | ........................ 251/14 |
| 3,367,365 A | * | 2/1968 | Stevens | ...................... 137/553 |
| 5,372,351 A | * | 12/1994 | Oliver | .................... 251/129.03 |
| 5,842,680 A | * | 12/1998 | Bustamante et al. | ... 251/129.11 |
| 6,113,063 A | * | 9/2000 | Takahashi et al. | .......... 137/907 |
| 6,173,736 B1 | * | 1/2001 | Ligh | ........................... 137/494 |

* cited by examiner

Primary Examiner—Philippe Derakshani
Assistant Examiner—D. Austin Bonderer
(74) Attorney, Agent, or Firm—Birch, Stewart, Kolasch & Birch, LLP

(57) ABSTRACT

The present invention discloses an expansion valve of an air conditioning system for an automobile which does not employ a conventional method that opens and shuts in response to a motion of a pin and ball and can control a flow of a refrigerant and control linearly a flow rate of a refrigerant flow into an evaporator by using holes of a fixed hole plate fixed to a valve body and holes of a rotatable cam which is rotated by a motion of a pin moved upward and downward in response to a pressure difference between an outlet of an evaporator of an expansion valve and an interior of a pressure proof barrel. In the expansion valve of the present invention, it is possible to prevent a hunttting phenomenon a reverse flow of the refrigerant into the evaporator and a noise caused by a ball, which have been generated in a conventional expansion valve, from creating.

4 Claims, 2 Drawing Sheets

EXPANSION VALVE OF AN AIR CONDITIONING SYSTEM IN AN AUTOMOBILE

BACKGROUND OF THE INVENTION

1. Field of the Invention

The present invention is related to an expansion valve of an air conditioning system in an automobile and more particularly, to an expansion valve of an air conditioning system in an automobile which can control linearly a flow of a refrigerant by using holes of a fixed hole plate fixed to a valve body and a rotatable cam, which is rotated by a vertical movement of a pin in response to a pressure resulted from the difference in an outlet pressure of an evaporator and inside pressure of a pressure proof barrel, without employing a conventional opening and shutting method by means of a motion of a pin and ball.

2. Information Disclosure Statement

In general, an air conditioning system for an automobile is an apparatus to lower an ambient temperature by using a principle of the refrigeration cycle with supplying cold air.

The air conditioning system for the automobile comprises four main members of an evaporator, a compressor, a condenser and an expansion valve.

The expansion valve in such air conditioning system for an automobile controls a flow rate of the refrigerant at an exit of an evaporator by supplying the refrigerant in a state of a wet steam of low pressure into the evaporator receives a liquid refrigerant of high pressure and throttles the liquid refrigerant to be evaporated easily and then supplies. A controlling of a flow rate of the refrigerant flow into the evaporator is performed so that a pressure in an inlet of the evaporator is controlled.

FIG. 4 is a sectional view showing an expansion valve of a conventional air conditioning system for an automobile. As shown in FIG. 4, a cylindrical valve body 10 in which a refrigerant flow passage is formed consists of an inlet 12, an inlet 14 of the evaporator, an outlet 16 of the evaporator, a mounting portion 19 formed at an upper portion for mounting a pressure proof barrel body 20, an orifice 18 for communicating the inlet 12 with the inlet 14 of the evaporator, and a pressure controlling portion 17 formed at a lower portion.

The inlet 12 through which a refrigerant of high pressure is flow into the expansion valve is formed at a side of a lower portion of the expansion valve.

The inlet 14 of the evaporator through which the refrigerant of high pressure flow from the inlet 12 is flow into the evaporator is formed at other side of an upper portion adjacent to the inlet 12. The outlet 16 of the evaporator penetrates the upper portion of the expansion valve to supply the refrigerant in state of a vapor heated in the evaporator to the compressor. The pressure controlling portion 17 controls an opening and shutting state of the orifice 18 selectively to control a flowing pressure applied to the outlet 16 of the evaporator.

A pressure proof barrel body 20 consisted of a pressure proof barrel 24 sealed by a metal diaphragm 22 with a predetermined pressure at an upper portion is mounted to the mounting portion 19.

A pin 30 is received in the valve body 10 in longitudinal direction and moved upward and downward according to the movement of the metal diaphragm 22 to which an upper end of the pin is fixed. A pin guide 32 formed at an upper end of the pin 30 is slid in the pressure proof barrel body 20 according to the flowing pressure from the evaporator, a lower end of the pin 30 is slid in the orifice 18.

A seal member 34 is installed to a mid portion of the pin 30 for dividing into the outlet 16 and the inlet 14 of the evaporator, a ball 35 is attached to the lower end of the pin 30 for opening and shutting the orifice 18. The ball 35 is supported elastically by a coil spring 37 and a ball base 36 fixed to an upper end of the coil spring 37, a screw 38 for adjusting a tension of the coil spring 37 is mounted to a lower portion of the coil spring 37 so that a pressure of the outlet 16 of the evaporator is controlled.

Hereinafter, an operating state of the conventional expansion valve will be described as follows.

In FIG. 4, the metal diaphragm 22 pushes the pin 30 downward along the orifice 18 according to a pressure difference between the outlet 16 of the evaporator and the interior of the pressure proof barrel 24 so that the ball 35 attached to the pin 30 is moved downward to open the orifice 18 and the flow passage through which the refrigerant can be flow into the evaporator is opened.

In the conventional expansion valve, a pressure of the outlet 16 of the evaporator is controlled by the flow rate of the refrigerant which is passed through the orifice 18 and the screw 38 for adjusting a tension of the coil spring 37, the controlled pressure of the outlet 16 of the evaporator controls the flow rate of the refrigerant which is passed along the orifice 18 by a means for opening and shutting a flow passage of the refrigerant.

In the conventional expansion valve, however, the ball is vibrated is by the flow of the refrigerant since the means for opening and shutting a flow passage of the refrigerant is consisted of the unfixed ball, a noise is caused by this.

Also, when the orifice is opened, it is impossible to adjust the flow rate exactly and linearly according to a vertical stroke of the pin so that an inflow amount of the refrigerant is increased suddenly by the ball, thus a temperature in the evaporator is changed suddenly. In addition, an excessive refrigerant is flow into the evaporator so that a huntting phenomenon occurs, that is, the expansion valve reduces the inflow amount of the refrigerant again.

Also, a vertical movement of the pin is controlled according to a pressure difference between the outlet of the evaporator and the interior of the pressure proof barrel, however, a setting pressure of the interior of the pressure proof barrel may be changed during the process of the mass production so that a heavy expense and time for managing the tolerance is consumed. Moreover, if the above problem becomes deeper, a liquid refrigerant is flow into the compressor so that a durability of the compressor is weakened.

Therefore, the present invention is invented to solve the problems as described, an object of the present invention is to provide an expansion valve of an air conditioning system for an automobile which does not employ a conventional opening and shutting method by means of a motion of a pin and ball and can control a flow of a refrigerant and control linearly a flow rate of a refrigerant flow into an evaporator by using holes of a fixed hole plate fixed to a valve body and holes of a rotatable cam which is rotated by a vertical stroke of a pin moved in response to a pressure difference between an outlet of an evaporator of an expansion valve and an interior of a pressure proof barrel, whereby it is possible to prevent a huntting phenomenon, a reverse flow of the refrigerant into the evaporator and a noise caused by a ball, which have been generated in a conventional expansion valve, from creating.

SUMMARY OF THE INVENTION

An expansion valve of an air conditioning system for an automobile of the present invention has a valve body in which a refrigerant flow passage is formed, a pressure proof barrel body comprising a pressure proof barrel sealed with a predetermined pressure by a metal diaphragm, and a device for opening or shutting the refrigerant flow passage in the expansion valve. The expansion valve of the present invention also comprises a pin having a upper end at which a pin guide having a vertical guide groove is formed, an upper surface with which a lower surface of the metal diaphragm is contacted and a lower portion on which a screw portion is formed; a rotatable cam combined with the screw portion of the pin; a fixed hole plate located at a lower portion of the rotatable cam and fixed to the valve body; a refrigerant wall dividing an inlet and an outlet of the evaporator and having a seal member mounted on an inner circumference through which the pin is passed, whereby a mid portion of the pin can be slid therein; a first spring located between an upper surface of the refrigerant wall and a lower surface of the pin guide at the outlet of the evaporator so as to enable an upper surface of the pin guide to contact with the metal diaphragm; and a second spring installed between a lower surface of the refrigerant wall and the washer so as to enable the rotatable cam to contact with the fixed hole plate.

In the expansion valve according to the present invention, the pin guide has a specific gap between a circumference surface of the guide groove and the pressure proof barrel body.

The rotatable cam is combined rotatably with the pin according to a vertical movement of the pin and has vertical holes through which the refrigerant can be passed, the a washer and a rolling bearing are mounted at an upper portion of the rotatable cam for supporting the second spring and a ball bearing is installed on a lower portion of the rotatable cam whereby the rotatable cam can be rotated freely between the second spring and the fixed hole plate.

Also, in the expansion valve of the present invention, the fixed hole plate has vertical holes which form the refrigerant flow passages along with the holes of the rotatable cam, each refrigerant passage is increased or reduced linearly in proportion to an overlapping area of the holes of the fixed hole plate and the rotatable cam according to the rotation of the rotatable cam.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout several views of the drawings.

DETAILED DESCRIPTION OF THE INVENTION

Hereinafter, the present invention will be described in greater detail with reference to accompanying drawings.

Figure 1:
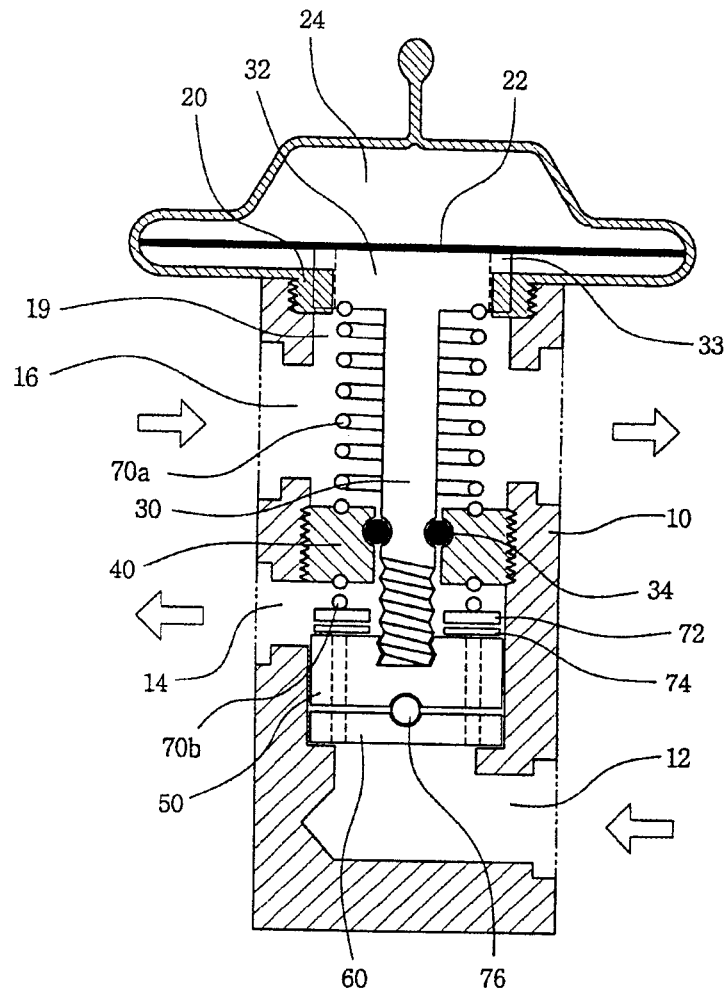
FIG. 1 is a sectional view showing an expansion valve according to the present invention.
Figure 2:
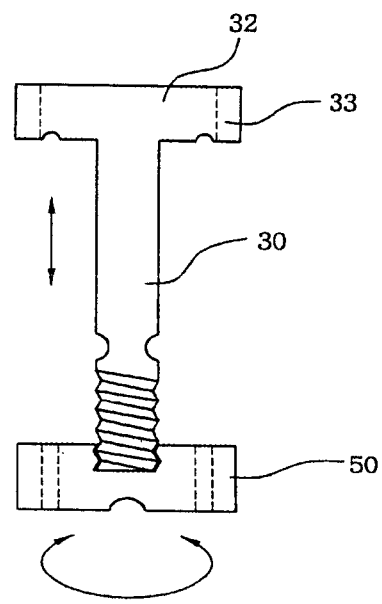
FIG. 2 is a view showing an operating state of a pin and a rotatable cam in the expansion valve according to the present invention.
Figure 3A:
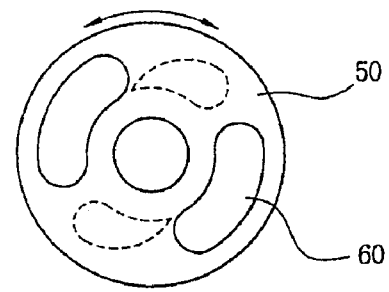
FIG. 3a and FIG. 3b are views showing an open and close states of a refrigerant flow passage in the expansion valve according to the present invention.
Figure 3B:
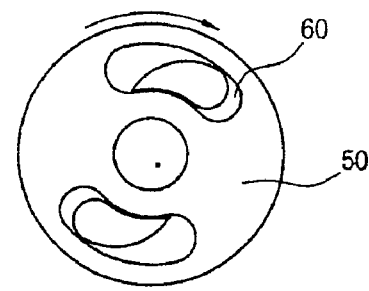
Figure 4:
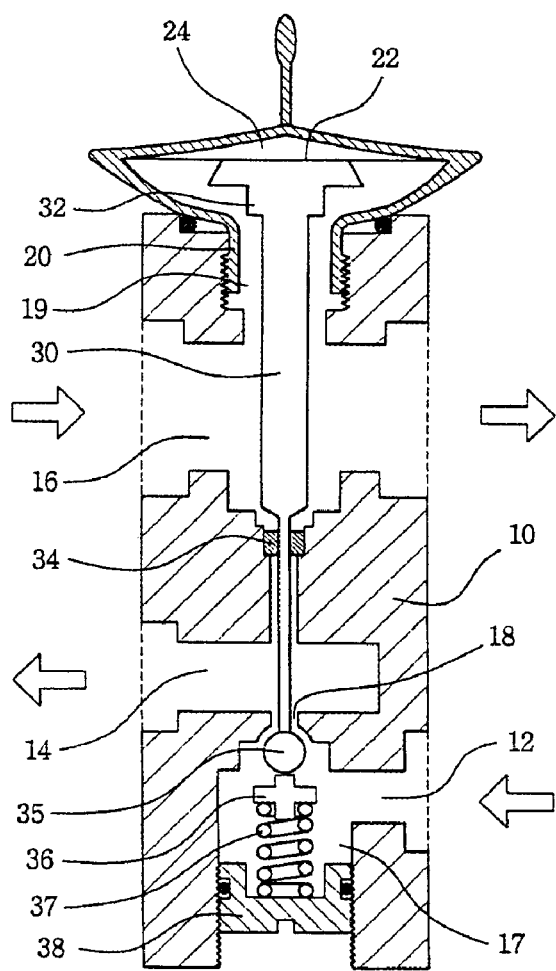
FIG. 4 is a sectional view showing a conventional expansion valve.

FIG. 1 is a sectional view showing an expansion valve of an air conditioning system for an automobile according to the present invention, FIG. 2 is a view showing an operating state of a pin and a rotatable cam in the expansion valve according to the present invention and FIGS. 3a and 3b are views showing an open and close states of a refrigerant flow passage consisted of holes of the rotatable cam and holes of the fixed hole plate in the expansion valve according to the present invention.

As shows in these figures, a cylindrical valve body 10 in which a refrigerant flow passage is formed consists of an inlet 12, an inlet 14 of the evaporator, an outlet 16 of the evaporator, a mounting portion 19 formed at an upper portion for mounting a pressure proof barrel body 20.

The inlet 12 through which the refrigerant of high pressure is flow into the expansion valve is formed at a side of a lower portion of the expansion valve. The inlet 14 of the evaporator through which the refrigerant of high pressure flow from the inlet 12 is flow into the evaporator is formed at other side of an upper portion adjacent to the inlet 12. The outlet 16 of the evaporator penetrates the upper portion of the expansion valve to supply the refrigerant in state of a vapor heated in the evaporator to a compressor.

A pressure proof barrel body 20 consisted of a pressure proof barrel 24 sealed by a metal diaphragm 22 with a predetermined pressure at an upper portion is mounted to the mounting portion 19.

A pin 30 is received in the valve body 10 in longitudinal direction, and moved upward and downward according to the movement of the metal diaphragm 22 to which an upper end of the pin 30 is fixed. A pin guide 32 formed at upper end of the pin 30 has a guide groove 33 formed vertically to prevent the pin 30 from the rotation and vibration and to facilitate a vertical movement of the pin 30.

In order that a pressure of the outlet 16 of the evaporator is supplied to the metal diaphragm 22 in the pressure proof barrel body 20, there is a certain gap between a circumference surface of the guide groove 33 and the pressure proof barrel body 20 so that a pressure of the outlet 16 of the evaporator corresponds to a pressure of a lower portion of the pressure proof barrel body 20 divided by the metal diaphragm 22.

As shown in FIG. 1 and FIG. 2, a screw portion is formed at a lower portion of the pin 30 so that the screw portion is coupled with the rotatable cam 50 which is rotatable according to the vertical movement of the pin 30 and has vertical hole through which the refrigerant can be passed. For supporting a second spring 70b, a washer 72 and a rolling bearing 74 are mounted at an upper portion of the rotatable cam 50 and a ball bearing 75 is installed at a lower portion of the rotatable cam 50 so that the rotatable cam can be moved freely between the second spring 70b and the fixed hole plate 60.

As shown in FIG. 3a and FIG. 3b, the rotatable cam 50 and the fixed hole plate 60 has vertical holes which penetrate the cam 50 and the plate 60, respectively. Therefore, when the rotatable cam 50 is rotated, an overlapped area of the holes of the cam 50 and the plate 60 is changed.

A refrigerant wall 40 is installed in the valve body 10 to divide into the inlet 14 and the outlet 16 of the evaporator, a seal member 34b is mounted to an inner circumference surface of the refrigerant wall 40 through which the pin 30 is passed and slid to prevent the refrigerants of two regions from mixing.

An upper first spring 70a is located between an upper surface of the refrigerant wall 40 and a lower surface of the pin guide 32 so that the upper first spring 70a supports the pin 30 elastically to be contact with the metal diaphragm 22 and the lower second spring 70b is installed between a lower surface of the refrigerant wall 40 and the washer 72 so that the lower second spring 70b supports the rotatable cam 50 elastically to be contact with the fixed hole plate 60.

Hereinafter, an operating state of the expansion valve according to the present invention will be described as below.

In FIG. 1, when a pressure of the interior of the pressure proof barrel 24 in the expansion valve is greater than that of the outlet 16 of the evaporator, the metal diaphragm 22 pushes the pin 30 downwardly, therefore, the rotatable cam 50 connected to the pin 30 is rotated (for example, in clockwise direction in FIG. 3a) in proportion to a downward stroke of the pin 30 so that an overlapping area which created by the holes of the rotatable cam 50 and the holes of the fixed hole plate 60 is increased. Consequently, the refrigerant is flow smoothly through the increased overlapping area of the both holes.

On the other hand, the pressure of the interior of the pressure proof barrel 24 in the expansion valve is smaller than that of the outlet 16 of the evaporator, the metal diaphragm 22 pulled the pin 30 upwardly, therefore, the rotatable cam 50 connected to the pin 30 is rotated (for example, in counterclockwise direction in FIG. 3a) in proportion to an upward stroke of the pin 30 so that an overlapping area which created by the holes of the rotatable cam 50 and the holes of the fixed hole plate 60 is decreased. Consequently, an area of the flow passage through which the refrigerant is flow is decreased.

Thus, a flow rate of the refrigerant can be controlled linearly by a change of the area of the refrigerant flow passage which is formed by an overlapping of the hole of the fixed hole plate 60 and the hole of the rotatable cam 50 rotated according to the vertical movement of the pin 30.

Also, the area of the refrigerant flow passage formed by both holes can be varied by change of a shape of the hole of the fixed hole plate 60 when both holes of the fixed hole plate 60 and the rotatable cam 50 are overlapped perfectly.

As described above, the expansion valve of the air conditioning system for the automobile according to the present invention uses the fixed hole plate having holes and fixed to the valve body and the movable cam being able to rotate according to the vertical movement of the pin so that a flow rate of the refrigerant flow into the evaporator can be adjusted linearly and a flow of the refrigerant can be controlled perfectly. Therefore, a performance of the air conditioning system and an endurance of the evaporator can be enhanced by embodying an optimum performance of the air conditioning system. A temperature of an interior of the automobile can be controlled easily for the convenience of the passengers and a noise may be reduced. In addition, heat efficiency can be increase so that it is possible to prevent an energy for spending unnecessarily and amount of use of the fuel can be reduced.

Although this invention has been described in its preferred form with a certain degree of particularity, it is appreciated by those skilled in the art that the present disclosure of the preferred form has been made only by way of example and that numerous changes in the details of the construction, combination, and arrangement of parts may be resorted to without departing from the spirit and scope of the invention.

What is claimed is:

1. An expansion valve of an air conditioning system for an automobile having a valve body in which a refrigerant flow passage is formed, a pressure proof barrel body comprising a pressure proof barrel sealed with a predetermined pressure by a metal diaphragm, and a device for opening or shutting the refrigerant flow passage in the expansion valve, comprising a pin having a upper end at which a pin guide having a vertical guide groove is formed, an upper surface with which a lower surface of the metal diaphragm is contacted and a lower portion on which a screw portion is formed;

a rotatable cam combined with the screw portion of the pin;

a fixed hole plate located at a lower portion of the rotatable cam and fixed to the valve body;

a refrigerant wall dividing an inlet and an outlet of the evaporator and having a seal member mounted on an inner circumference through which the pin is passed, whereby a mid portion of the pin can be slid therein;

a first spring located between an upper surface of the refrigerant wall and a lower surface of the pin guide at the outlet of the evaporator so as to enable an upper surface of the pin guide to contact with the metal diaphragm; and a second spring installed between a lower surface of the refrigerant wall and the washer so as to enable the rotatable cam to contact with the fixed hole plate.

2. The expansion valve of claim 1, wherein the pin guide has a specific gap between a circumference surface of the guide groove and the pressure proof barrel body.

3. The expansion valve of claim 1, wherein the rotatable cam is combined rotatably with the pin according to a vertical movement of the pin and has vertical holes through which the refrigerant can be passed, the a washer and a rolling bearing are mounted at an upper portion of the rotatable cam for supporting the second spring and a ball bearing is installed on a lower portion of the rotatable cam whereby the rotatable cam can be rotated freely between the second spring and the fixed hole plate.

4. The expansion valve of claim 1, wherein the fixed hole plate has vertical holes which form the refrigerant flow passages along with the holes of the rotatable cam, each refrigerant passage is increased or reduced linearly in proportion to an overlapping area of the holes of the fixed hole plate and the rotatable cam according to the rotation of the rotatable cam.

\* \* \* \* \*